(12) United States Patent
Sato et al.

(10) Patent No.: US 7,576,479 B2
(45) Date of Patent: *Aug. 18, 2009

(54) ELECTRON EMITTER

(75) Inventors: Kei Sato, Tokai (JP); Tetsuya Hattori, Nagoya (JP); Hirofumi Yamaguchi, Komaki (JP); Shuichi Ozawa, Nagoya (JP)

(73) Assignee: NGK Insulators, Ltd., Nagoya-Shi (JP)

( * ) Notice: Subject to any disclaimer, the term of this patent is extended or adjusted under 35 U.S.C. 154(b) by 256 days.

This patent is subject to a terminal disclaimer.

(21) Appl. No.: 11/673,769

(22) Filed: Feb. 12, 2007

(65) Prior Publication Data

US 2007/0188069 A1 Aug. 16, 2007

(30) Foreign Application Priority Data

Feb. 16, 2006 (JP) ............................. 2006-039035
Jul. 25, 2006 (JP) ............................. 2006-201494

(51) Int. Cl.
*H01J 1/14* (2006.01)
*H01J 1/05* (2006.01)

(52) U.S. Cl. .................................. 313/311; 313/346 R

(58) Field of Classification Search .................. None
See application file for complete search history.

(56) References Cited

U.S. PATENT DOCUMENTS 7,176,609 B2  2/2007 Takeuchi et al.
7,276,462 B2 * 10/2007 Yamaguchi et al. ......... 501/135
7,329,978 B2 * 2/2008 Konishi ...................... 313/306
7,423,512 B1 * 9/2008 Reitz et al. ................... 338/21
2006/0043863 A1 * 3/2006 Yamaguchi et al. ......... 313/311

FOREIGN PATENT DOCUMENTS

EP   1 521 231 A2    4/2005
JP   2005-183361 A1  7/2005

* cited by examiner

*Primary Examiner*—Ashok Patel
(74) *Attorney, Agent, or Firm*—Burr & Brown

(57) ABSTRACT

Provided is a piezoelectric-film-type electron emitter of high durability exhibiting suppressed reduction in electron emission quantity, which reduction would otherwise occur with repeated use of the electron emitter. The electron emitter includes a substrate, a lower electrode, an emitter layer, and an upper electrode. The upper electrode has a plurality of openings, and an emitter section located on the top surface of the emitter layer is exposed through the openings to a reduced-pressure atmosphere. The electron emitter is configured so that when a pulse drive voltage Va is applied between the lower electrode and the upper electrode, electrons are accumulated on the emitter section, and then the electrons are emitted toward the reduced-pressure atmosphere. The emitter layer contains a primary component (i.e., a ferroelectric composition) and an additional component. The additional component contains a transition metal oxide of high oxidation number which can serve as an oxidizing agent by being converted into an oxide of the transition metal of lower oxidation number.

8 Claims, 6 Drawing Sheets

ELECTRON EMITTER

BACKGROUND OF THE INVENTION

1. Field of the Invention

The present invention relates to an electron emitter which is suitably employed as an electron beam source in a variety of apparatuses that utilize electron beams, including a field emission display (FED), an electron beam irradiation apparatus, a light source, an electronic-component-manufacturing apparatus, and an electronic circuit component.

2. Description of the Related Art

Such an electron emitter includes an emitter section which is provided in a reduced-pressure atmosphere having a predetermined vacuum level. The emitter section is configured so that it can emit electrons into the reduced-pressure atmosphere through application of a predetermined driving electric field.

In an FED, a plurality of electron emitters having the aforementioned configuration are two-dimensionally arrayed on a substrate formed of, for example, glass or ceramic material. In addition, a plurality of phosphors corresponding to the electron emitters are arrayed with a predetermined gap provided therebetween by the aforementioned reduced-pressure atmosphere. The FED is configured so that electrons emitted from the electron emitters fly through the aforementioned gap and collide with the phosphors, and the phosphors hit by the electrons fluoresce, thereby displaying a desired image.

Known electron emitters having the aforementioned configuration include an electron emitter having an emitter section formed of a dielectric material (piezoelectric material). Such an electron emitter is called a "piezoelectric-film-type electron emitter." This type of electron emitter is produced at low cost, and therefore is suitable for use in an FED, in which, as described above, numerous electron emitters are two-dimensionally arrayed on a substrate having a relatively large area.

A conventionally known piezoelectric-film-type electron emitter is disclosed in, for example, Japanese Patent Application Laid-Open (kokai) No. 2005-183361.

The aforementioned piezoelectric-film-type electron emitter includes an emitter section formed of a dielectric layer, a first electrode, and a second electrode. The first electrode is provided on the top surface of the dielectric layer. The second electrode is provided on the bottom surface of the dielectric layer. On the top surface side of the dielectric layer, a portion of the emitter section in the vicinity of the peripheral edge of the first electrode is exposed to the outside of the piezoelectric-film-type electron emitter (i.e., to the aforementioned reduced-pressure atmosphere). The piezoelectric-film-type electron emitter is configured so that the thus-exposed portion serves as an electron emission region, which plays an important role for electron emission in the electron emitter.

The piezoelectric-film-type electron emitter having the aforementioned configuration is operated as follows. Firstly, in the first stage, voltage is applied between the first electrode and the second electrode so that the first electrode is higher in electric potential. An electric field generated by the applied voltage brings the emitter section into a predetermined polarization state. Subsequently, in the second stage, voltage is applied between the first electrode and the second electrode so that the first electrode is lower in electric potential. Through this voltage application, the polarization of the emitter section is inverted, and electrons are accumulated on the electron emission region. Subsequently, in the third stage, voltage is again applied so that the first electrode is higher in electric potential. Through this voltage application, the polarization of the emitter section is re-inverted. With this polarization inversion, the electrons accumulated on the electron emission region are emitted from the emitter section by means of electrostatic repulsion between the electrons and dipoles, and the thus-emitted electrons fly in the aforementioned reduced-pressure atmosphere. Thus, the piezoelectric-film-type electron emitter emits electrons.

However, the aforementioned conventional piezoelectric-film-type electron emitter involves a problem in that electron emission quantity is considerably reduced with repeated use thereof. Among components of the piezoelectric-film-type electron emitter (i.e., the aforementioned emitter section, first electrode, and second electrode, and a substrate for supporting the emitter section and electrodes), the emitter section would generally undergo change in properties with repeated use of the electron emitter. Therefore, reduction in electron emission quantity is considered to be caused mainly by impairment of the emitter section with repeated use of the piezoelectric-film-type electron emitter.

Conceivably, impairment of the emitter section is due to deterioration of the electron accumulation ability thereof. Specifically, impairment of the emitter section is considered to occur through the following mechanism: reduction in the amount of electrons accumulated on the emitter section lowers the amount of electrons which fly in the aforementioned third stage, whereby electron emission quantity is reduced.

Conceivably, deterioration of the electron accumulation ability of the emitter section is caused mainly by deterioration of the electrical insulating properties of the surface of the emitter section. Conceivably, deterioration of the insulating property of the surface of the emitter section occurs as a result of precipitation of an elemental metal through reduction of a corresponding metal element contained in a dielectric material constituting the emitter section. Particularly, in a reduced-pressure atmosphere, such precipitation of elemental metal through reduction of the dielectric material is likely to occur, since oxygen partial pressure is low in the atmosphere.

The aforementioned piezoelectric-film-type electron emitter generally employs a lead-containing piezoelectric material as a dielectric material. When the piezoelectric-film-type electron emitter formed of such a lead-containing piezoelectric material is operated in a reduced-pressure atmosphere, metal lead tends to precipitate on the surface of the emitter section.

SUMMARY OF THE INVENTION

The present invention provides an electron emitter including an emitter layer, a first electrode, and a second electrode. The emitter layer is provided so as to face a reduced-pressure atmosphere. Specifically, in the electron emitter of the present invention, a portion of the emitter layer that faces the reduced-pressure atmosphere forms an emitter section (i.e., an electron emission region). The first electrode and the second electrode are provided on the emitter layer. The first electrode is provided on the top surface of the emitter layer in the vicinity of the emitter section.

The electron emitter of the present invention is configured so that when a predetermined driving electric field is applied to the emitter layer through application of a predetermined drive voltage between the first electrode and the second electrode, electrons are emitted from the emitter layer toward the aforementioned reduced-pressure atmosphere.

A characteristic feature of the electron emitter of the present invention resides in that the emitter layer (emitter section) comprises a primary component comprising a ferroelectric composition, and an additional component comprising a transition metal oxide of high oxidation number which can serve as an oxidizing agent by being converted into an oxide of the transition metal of lower oxidation number.

Typical examples of the additional component include oxides of transition metals (manganese, iron, chromium, cobalt, tungsten, and molybdenum) of high oxidation number, such as $MnO_2$, $Fe_2O_3$, $Cr_2O_3$, $Co_3O_4$, $MoO_3$, and $WO_3$. These additional components may be employed singly or in combination of two or more species. The amount of the additional component is preferably 0.05 to 5 wt. % as reduced to any of the aforementioned oxides.

The additional component may be mixed in advance with a raw material of the primary component (e.g., an oxide or a carbonate salt) before calcination of the raw material. Alternatively, the additional component may be added to the raw material after calcination of the raw material and before molding and firing of the resultant mixture.

The aforementioned ferroelectric composition may be a lead-containing piezoelectric material. The piezoelectric material may be a lead magnesium niobate (PMN)-lead zirconate (PZ)-lead titanate (PT) ternary solid solution composition.

The aforementioned ferroelectric composition is preferably a PMN-PZ-PT ternary solid solution composition represented by the following formula (I):

$$Pb_xSr_pLa_q(Mg_{y/3}Nb_{2/3})_aTi_bZr_cO_3 \quad (I)$$

[wherein $0.85 \leq x \leq 1.03$, $0.02 \leq p \leq 0.15$, $0.001 \leq q \leq 0.15$, $0.8 \leq y \leq 1.0$, $0.1 \leq a \leq 0.55$, $0.15 \leq b \leq 0.45$, $0.1 \leq c \leq 0.6$, and $a+b+c=1$].

In the aforementioned ferroelectric composition, lead may be partially substituted by lanthanum and/or strontium.

The aforementioned ferroelectric composition may contain at least one of silicon oxide ($SiO_2$), nickel oxide ($NiO_2$), and cerium oxide ($CeO_2$). Of these, silicon oxide ($SiO_2$) can form a coating on the surface of the emitter layer, to thereby suppress reduction in electron emission quantity. The amount of such an oxide added to the ferroelectric composition is preferably 2 wt. % or less.

Particularly preferably, the electron emitter of the present invention is configured so that it can be operated as follows: in the first stage, voltage is applied so that the first electrode becomes higher in electric potential than the second electrode, whereby the emitter section is brought into a predetermined polarization state; in the second stage, voltage is applied so that the first electrode becomes lower in electric potential than the second electrode, whereby electrons are emitted (supplied) from the first electrode toward the emitter section; i.e., electrons are accumulated on the emitter section (i.e., the emitter section is electrically charged); and in the third stage, voltage is applied so that the first electrode becomes higher in electric potential than the second electrode, whereby the electrons accumulated on the emitter section are emitted therefrom.

With this configuration, the quantity of the charge on the emitter section can be controlled in the second stage in a relatively easy manner, and thus high electron emission quantity can be reliably attained with high controllability. According to this configuration, even when the electron emitter is repeatedly employed under the aforementioned severe operation conditions (i.e., application of alternating voltage with different polarities), considerable reduction in electron emission quantity can be suppressed.

In the electron emitter of the present invention, which has the aforementioned configuration, the additional component serves as an oxidizing agent in the emitter layer (emitter section), and thus suppresses reduction of the aforementioned metal element contained in the dielectric material constituting the emitter section. Therefore, precipitation of the elemental metal on the surface of the emitter layer (emitter section) is suppressed.

Thus, according to the electron emitter of the present invention, deterioration of the electron accumulation ability of the emitter layer (emitter section) is suppressed; i.e., reduction in electron emission quantity, which is due to reduction in the quantity of electrons accumulated on the emitter section, is suppressed. Therefore, even when the electron emitter (piezoelectric-film-type electron emitter) of the present invention is repeatedly employed, considerable reduction in electron emission quantity is suppressed; i.e., the electron emitter exhibits enhanced durability.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF THE INVENTION

A preferred embodiment of the electron emitter of the present invention will next be described with reference to the drawings and tables. The material and structure of components of the electron emitter of the present invention will be described with reference to one typical embodiment, for the sake of readily understandable and consistent illustration. Modifications of the material and structure of the components of the electron emitter according to the embodiment will be collectively described after description of the configuration, operation, and effect of the electron emitter according to the embodiment.

<Schematic Description of FED Including Electron Emitter>

Figure 1:
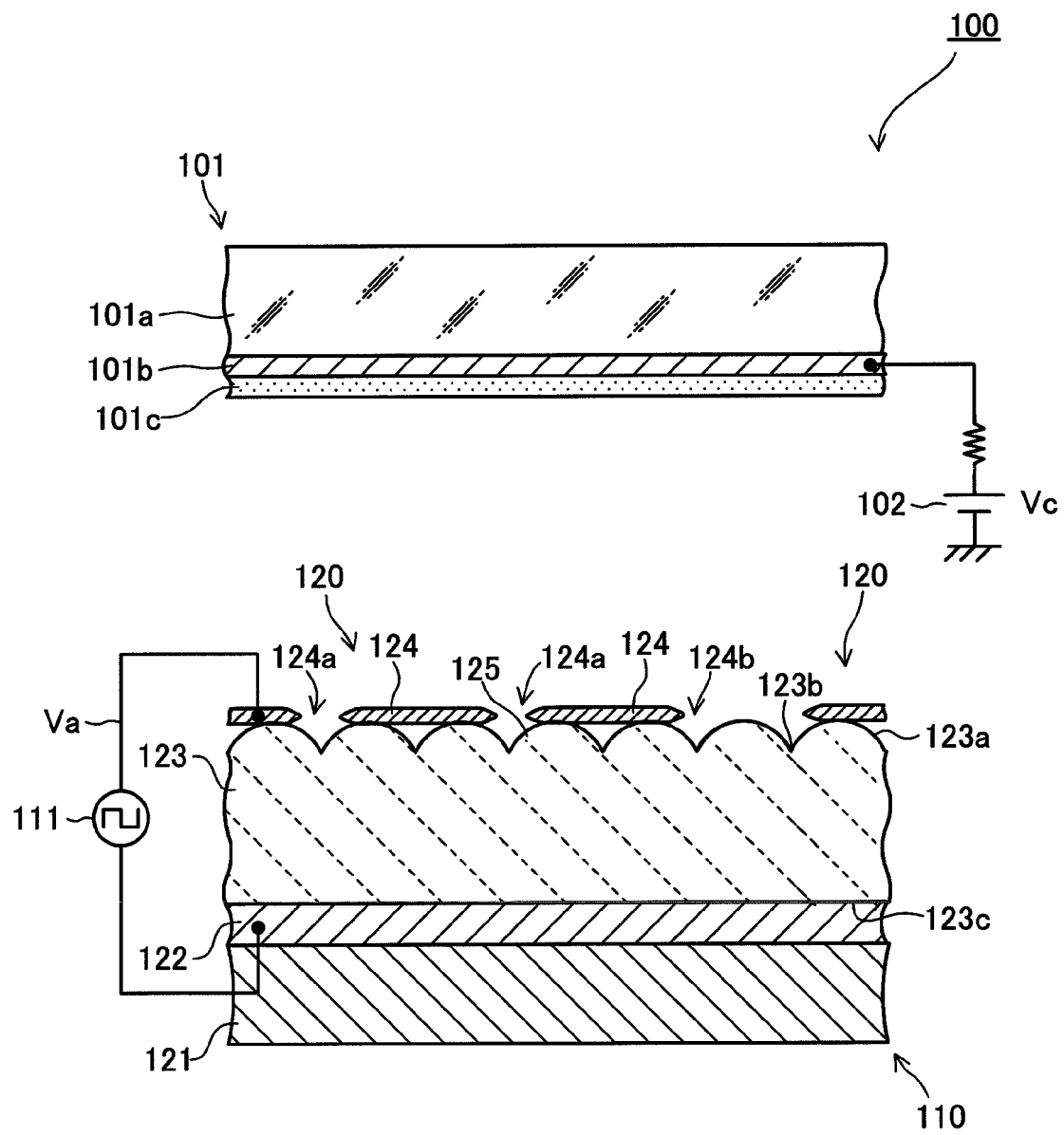
FIG. 1 is a cross-sectional view schematically showing a display to which an electron emitter according to an embodiment of the present invention is applied.

FIG. 1 is a cross-sectional view schematically showing a display 100, which is an FED to which the electron emitter according to the present embodiment is applied.

As shown in FIG. 1, the display 100 includes a light-emitting panel 101. The light-emitting panel 101 includes a transparent plate 101a, a collector electrode 101b, and a phosphor layer 101c.

The transparent plate 101a is formed of a glass plate or an acrylic plate. The collector electrode 101b is formed on the surface on the lower side (as viewed in FIG. 1) of the transparent plate 101a. The collector electrode 101b is formed of a transparent electrode such as an indium tin oxide (ITO) thin film.

The phosphor layer 101c is formed on the lower surface of the collector electrode 101b. The phosphor layer 101c is configured so that when electrons flying toward the collector electrode 101b, which is connected to a bias voltage source 102 via a predetermined resistor, collide with the phosphor layer 101c, fluorescence can be emitted. The bias voltage source 102 is configured so as to apply a predetermined collector voltage Vc between the ground and the collector electrode 101b.

As shown in FIG. 1, an electron-emitting device 110 is provided below the light-emitting panel 101. The electron-emitting device 110 is electrically connected to a pulse generator 111. The electron-emitting device 110 is configured so that when a drive voltage Va is applied thereto by means of the pulse generator 111, electrons are emitted toward the light-emitting panel 101 (the collector electrode 101b and the phosphor layer 101c).

A predetermined space is provided between the electron-emitting device 110 and the light-emitting panel 101 (phosphor layer 101c). The space between the electron-emitting device 110 and the phosphor layer 101c is a reduced-pressure atmosphere having a predetermined vacuum level of, for example, $10^2$ to $10^{-6}$ Pa (more preferably $10^{-3}$ to $100^{-5}$ Pa).

The display 100 is configured so that electrons are emitted, to the reduced-pressure atmosphere, from the electron-emitting device 110 through application of the drive voltage Va to the device 110 by means of the pulse generator 111, and that, by means of an electric field generated through application of the collector voltage Vc, the thus-emitted electrons fly toward the collector electrode 101b and collide with the phosphor layer 101c, whereby fluorescence is emitted.

<Configuration of Electron-Emitting Device>

The electron-emitting device 110 is configured so as to have a thin flat plate shape. The electron-emitting device 110 includes a number of two-dimensionally arranged electron emitters 120 according to the present embodiment.

Each of the electron emitters 120 includes a substrate 121, a lower electrode 122, an emitter layer 123, and an upper electrode 124. The substrate 121 is formed of a heat-resistant glass thin plate or a ceramic thin plate. The lower electrode 122 is formed on the substrate 121. The lower electrode 122 is formed of a metallic film having a thickness of 20 μm or less. The lower electrode 122 is electrically connected to the aforementioned pulse generator 111.

The emitter layer 123 is formed on the lower electrode 122. In the present embodiment, the emitter layer 123 is formed of a polycrystalline ferroelectric material having a thickness of 1 to 300 μm (more preferably 5 to 100 μm). The ferroelectric material contains a primary component (i.e., a ferroelectric composition), and an additional component comprising a transition metal oxide of high oxidation number which can serve as an oxidizing agent by being converted into an oxide of the transition metal of lower oxidation number.

The primary component is preferably a lead-containing ferroelectric composition, particularly preferably a PMN-PZ-PT ternary solid solution composition. Preferably, the ternary solid solution composition is, for example, a composition represented by the following formula (I):

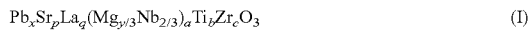
$$Pb_xSr_pLa_q(Mg_{y/3}Nb_{2/3})_aTi_bZr_cO_3 \qquad (I)$$

[wherein $0.85 \leq x \leq 1.03$, $0.02 \leq p \leq 0.15$, $0.001 \leq q \leq 0.15$, $0.8 \leq y \leq 1.0$, $0.1 \leq a \leq 0.55$, $0.15 \leq b \leq 0.45$, $0.1 \leq c \leq 0.6$, and $a+b+c=1$].

The aforementioned additional component is preferably manganese dioxide ($MnO_2$), ferric oxide ($Fe_2O_3$), chromic oxide ($Cr_2O_3$), tricobalt tetroxide ($Co_3O_4$), molybdenum trioxide ($MoO_3$), tungsten trioxide ($WO_3$), or the like.

Microscopic concavities and convexities due to, for example, crystal grain boundaries are formed on an upper surface 123a of the emitter layer 123. Specifically, numerous concavities 123b are formed on the upper surface 123a. The upper surface 123a is formed so as to have a surface roughness Ra (centerline average roughness, unit: μm) of 0.005 or more and 3.0 or less.

The emitter layer 123 is formed on the lower electrode 122 such that a lower surface 123c of the layer 123, which is opposite the upper surface 123a, is in contact with the lower electrode 122. The upper electrode 124 is formed on the upper surface 123a of the emitter layer 123. The upper electrode 124 is electrically connected to the aforementioned pulse generator 111.

The upper electrode 124 is formed of a thin layer of an electrically conductive material (thickness: about 0.1 to about 20 μm). Examples of the electrically conductive material which may be employed for forming the upper electrode 124 include metallic film, metallic particles, electrically conductive non-metallic film (e.g., carbon film or electrically conductive non-metallic oxide film), and electrically conductive non-metallic particles (e.g., carbon particles or electrically conductive oxide particles). The aforementioned metallic film or metallic particles are preferably formed of platinum, gold, silver, iridium, palladium, rhodium, molybdenum, tungsten, or an alloy thereof. The aforementioned electrically conductive non-metallic film or electrically conductive non-metallic particles are preferably formed of graphite, ITO (indium tin oxide), or LSCO (lanthanum strontium cobalt oxide). When the upper electrode 124 is formed of metallic particles or electrically conductive non-metallic particles, preferably, the particles are in a scale-like, plate-like, foil-like, acicular, rod-like, or coil-like form.

The upper electrode 124 has a plurality of openings 124a. The openings 124a are formed such that the upper surface 123a of the emitter layer 123 is exposed to the outside of the electron-emitting device 110 (i.e., the aforementioned reduced-pressure atmosphere; the same shall apply hereinafter). The upper surface 123a of the emitter layer 123 is exposed to the outside of the electron-emitting device 110 also at peripheral edge portions 124b of the upper electrode 124. A portion of the emitter layer 123 exposed to the outside of the electron-emitting device 110 constitutes an emitter section 125, which serves as a main section for electron emission.

As described below, the electron emitter 120 is configured so that electrons supplied from the upper electrode 124 are accumulated on the emitter section 125, and the thus-accumulated electrons are emitted toward the outside of the electron-emitting device 110 (i.e., toward the phosphor layer 101c).

<Detailed Description of Electron Emitter>

Figure 2:
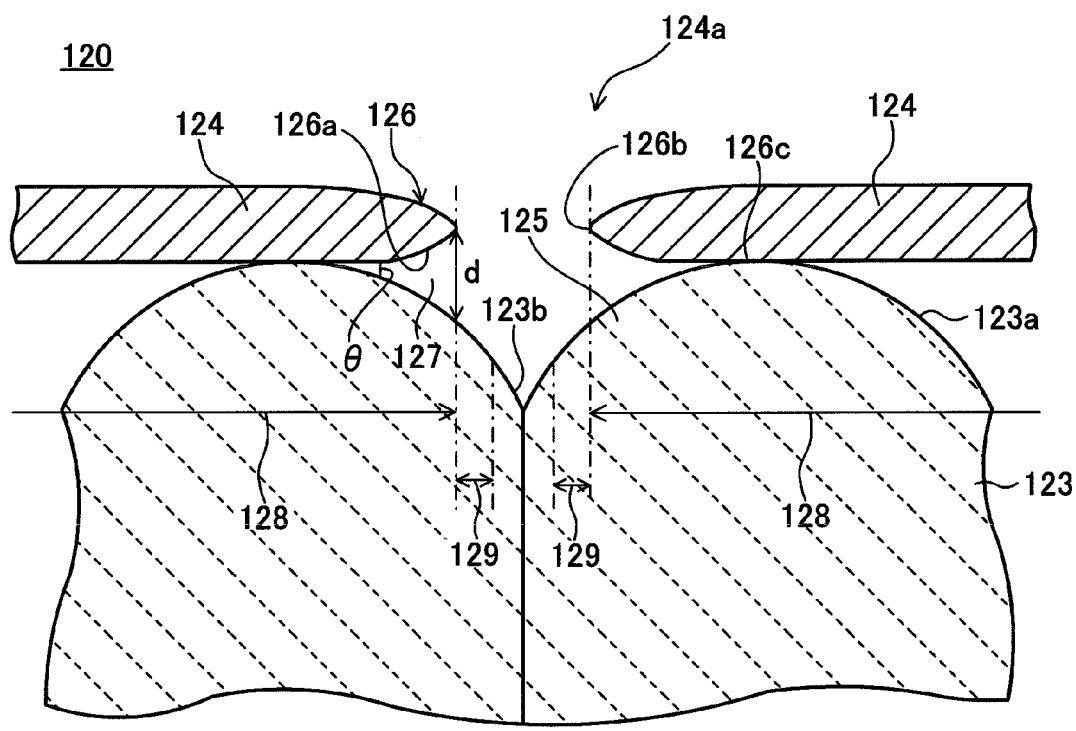
FIG. 2 is an enlarged cross-sectional view showing essential portions of the electron emitter of FIG. 1.

FIG. 2 is an enlarged cross-sectional view showing essential portions of the electron emitter 120 of FIG. 1. In the case shown in FIG. 1 or 2, the concavities 123b and the openings 124a are formed in one-to-one correspondence. However, in some cases, a plurality of concavities 123b may be formed in a single opening 124a, or no concavities 123b may be formed in an opening 124a.

As shown in FIG. 2, in the upper electrode 124, a peripheral portion 126, which is a portion in the vicinity of the opening 124a, is provided so as to overhang the emitter section 125

(hereinafter the portion may be referred to as an "overhanging portion"). Specifically, the overhanging portion 126 is formed such that a lower surface 126a and a tip end 126b of the overhanging portion 126 are apart from the upper surface 123a of the emitter layer 123 corresponding to the emitter section 125. The overhanging portion 126 is also formed at positions corresponding to the peripheral edge portions 124b (see FIG. 1) of the upper electrode 124.

A triple junction 126c is formed at a position at which the overhanging portion 126 is in contact with the upper surface 123a of the emitter layer 123; i.e., at a position at which the emitter layer 123 is in contact with the upper electrode 124 and the aforementioned reduced-pressure atmosphere.

The triple junction 126c is a site (electric field concentration point) at which lines of electric force concentrate (where electric field concentration occurs) when, as shown in FIG. 1, a drive voltage Va is applied between the lower electrode 122 and the upper electrode 124. As used herein, the expression "site at which lines of electric force concentrate" refers to a site at which lines of electric force that are generated from the lower electrode 122 at even intervals concentrate, when the lines of electric force are drawn under the assumption that the lower electrode 122, the emitter layer 123, and the upper electrode 124 are flat plates each having a cross section extending infinitely. The state of concentration of lines of electric force (i.e., the state of electric field concentration) can be readily observed through simulation by means of numerical analysis employing the finite-element method.

As shown in FIG. 2, a gap 127 is formed between the lower surface 126a and tip end 126b of the overhanging portion 126 and the upper surface 123a (emitter section 125) of the emitter layer 123. The gap 127 is formed such that the maximum gap d satisfies the following relation: $0\,\mu m < d \leq 10\,\mu m$, and the angle θ between the lower surface 126a and the surface of the emitter section 125 satisfies the following relation: $1° \leq θ \leq 60°$.

The tip end 126b of the overhanging portion 126 has such a shape as to serve as the aforementioned electric field concentration point. Specifically, the overhanging portion 126 has such a cross-sectional shape as to be acutely pointed toward the tip end 126b of the portion 126; i.e., the thickness gradually decreases.

The openings 124a may be formed to assume a variety of shapes as viewed in plane (as viewed from above in FIG. 2), including a circular shape, an elliptical shape, a polygonal shape, and an irregular shape. The openings 124a are formed such that the average of diameters of the openings 124a as viewed in plane is 0.1 μm or more and 20 μm or less. The reason for this is described below. As used herein, the expression "the average of diameters of the openings 124a" refers to the number-based average of diameters of circles having areas identical to those of the openings 124a.

As shown in FIG. 2, regions of the emitter layer 123 where polarization is inverted in accordance with application of the aforementioned drive voltage (drive voltage Va shown in FIG. 1) are first regions 128 and second regions 129. The first regions 128 correspond to regions facing the upper electrode 124. The second regions 129 correspond to regions of the openings 124a that extend from the tip ends 126b of the overhanging portions 126 toward the centers of the openings 124a. The range of the second regions 129 varies depending on the level of the drive voltage Va and the degree of electric field concentration in the vicinity of the second regions 129.

When the average diameter of the openings 124a falls within the above-described range (i.e., 0.1 μm or more and 20 μm or less), a sufficient quantity of electrons are emitted through the openings 124a, and high electron emission efficiency is secured.

When the average diameter of the openings 124a is less than 0.1 μm, the area of the second regions 129 decreases. The second regions 129 constitute primary regions of the emitter section 125 which temporarily accumulates electrons supplied from the upper electrode 124 and then emits the electrons. Therefore, a decrease in area of the second regions 129 reduces the quantity of electrons emitted. In contrast, when the average diameter of the openings 124a exceeds 20 μm, the ratio of the second regions 129 to the entirety of the emitter section 125 (occupancy of the second regions) decreases, resulting in low electron emission efficiency.

<Equivalent Circuit of Electron Emitter>

Figure 3:
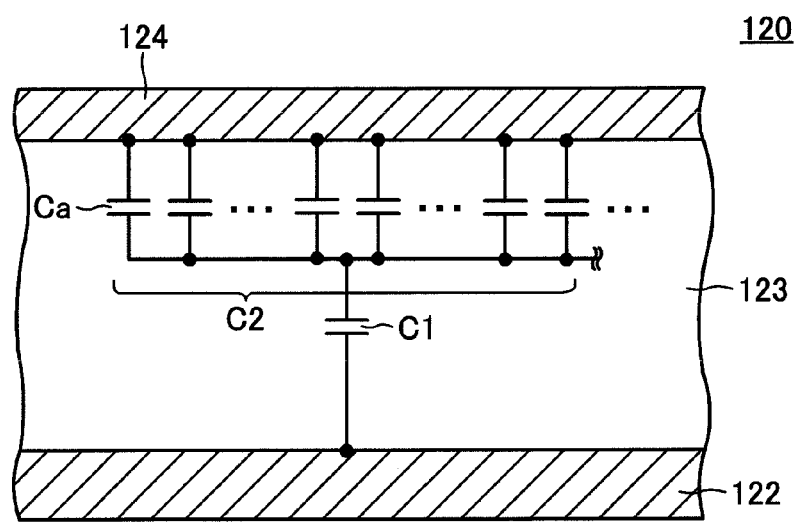
FIG. 3 shows an equivalent circuit of the electron emitter of FIG. 1.
Figure 4:
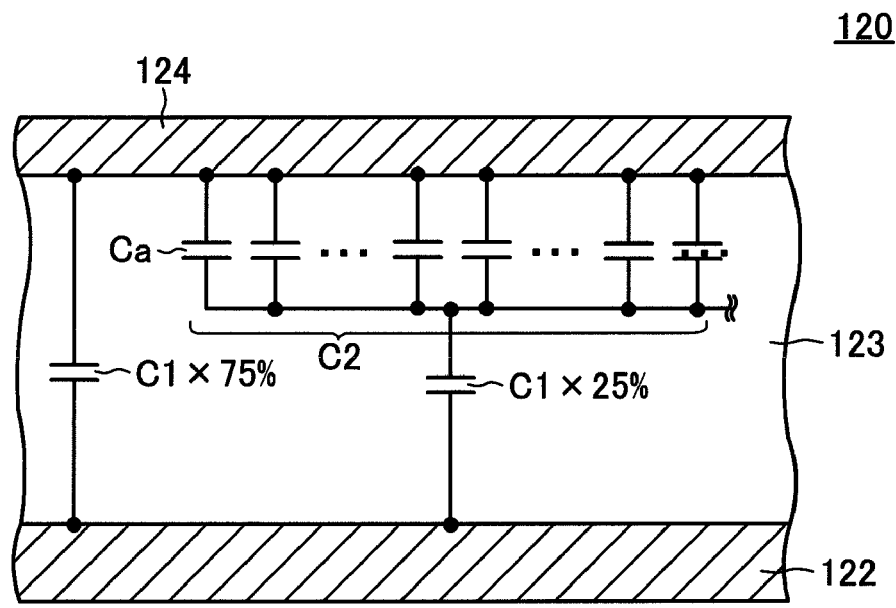
FIG. 4 shows another equivalent circuit of the electron emitter of FIG. 1.

FIGS. 3 and 4 show equivalent circuits of the electron emitter 120 of FIG. 1.

Most briefly, the configuration of the electron emitter 120 according to the present embodiment can be approximated to an equivalent circuit as shown in FIG. 3. "C1" of FIG. 3 is a capacitor formed by sandwiching the emitter layer 123 between the lower electrode 122 and the upper electrode 124. "Ca" of FIG. 3 is a capacitor formed by any of the gaps 127 (see FIG. 2). "C2" of FIG. 3 is a capacitor formed of an aggregate of a plurality of capacitors Ca, which are connected in parallel. The capacitor C1 associated with the emitter layer 123 is connected in series to the capacitor C2 associated with the gaps 127 (see FIG. 2).

However, the equivalent circuit, in which the capacitor C1 associated with emitter layer 123 is connected in series to the capacitor C2 formed of the aggregate of the capacitors Ca is not practical. In practice, conceivably, the percentage of a portion of the capacitor C1 associated with the emitter layer 123 that is connected in series to the capacitor C2 formed of the capacitor aggregate varies with, for example, the number and area of the openings 124a (see FIG. 2) formed in the upper electrode 124.

Capacitance will now be calculated under the assumption that, for example, 25% of the capacitor C1 associated with the emitter layer 123 is connected in series to the capacitor C2 as shown in FIG. 4.

Conditions of the calculation are as follows: the gaps 127 are in a vacuum (i.e., specific dielectric constant $\epsilon_r = 1$); the maximum gap d of the gaps 127 is 0.1 μm; the area S of a region corresponding to a single gap 127 is 1 μm×1 μm; the number of the gaps 127 is 10,000; the specific dielectric constant of the emitter layer 123 is 2,000; the thickness of the emitter layer 123 is 20 μm; and the facing area between the lower electrode 122 and the upper electrode 124 is 200 μm×200 μm.

Under the above-described conditions, the capacitance of the capacitor C1 is 35.4 pF, and the capacitance of the capacitor C2 is 0.885 pF. The overall capacitance between the upper electrode 124 and the lower electrode 122 is 27.5 pF, which is lower than the capacitance of the capacitor C1 associated with the emitter layer 123 (i.e., 35.4 pF); i.e., the overall capacitance is 78% the capacitance of the capacitor C1.

As described above, the overall capacitance of the capacitor C2 formed of the aggregate of the capacitors Ca associated with the gaps 127 (see FIG. 2) is considerably lower than the capacitance of the capacitor C1 (associated with the emitter layer 123) which is connected in series to the capacitor C2. Therefore, when the drive voltage Va is applied to this series circuit, most of the voltage Va is applied to the capacitors Ca (C2), whose capacitance is lower than that of the capacitor C1. In other words, most of the drive voltage Va is applied to the gaps 127 (see FIG. 2). This attains an increase in output of the electron emitter.

As described above, the capacitor C1 associated with the emitter layer 123 is connected in series to the capacitor C2 formed of the aggregate of the capacitors Ca associated with the gaps 127 (see FIG. 2). Therefore, the overall capacitance of this series circuit is lower than the capacitance of the capacitor C1 associated with the emitter layer 123. Therefore, the electron emitter exhibits a preferred property (i.e., reduction in overall power consumption).

<Electron Emission Principle of Electron Emitters>

Figure 5:
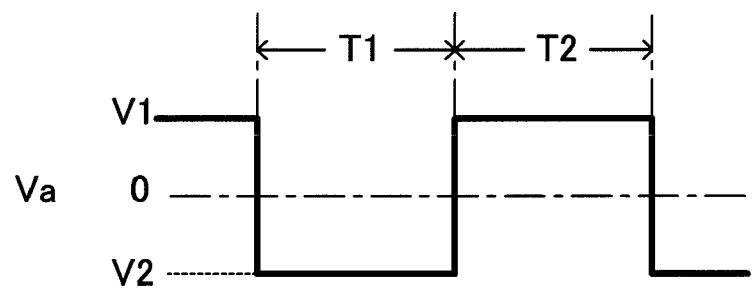
FIG. 5 is a diagram showing the waveform of a drive voltage Va applied to the electron emitter of FIG. 1.

FIG. 5 is a diagram showing the waveform of a drive voltage Va applied to the electron emitter 120 shown in FIG. 1. FIGS. 6 and 7 each show the state of operation of the electron emitter 120 of FIG. 1 in the case where the drive voltage Va shown in FIG. 5 is applied to the electron emitter 120. Next will be described the principle of electron emission of the electron emitter 120 with reference to FIGS. 5 to 7.

In the present embodiment, as shown in FIG. 5, the drive voltage Va applied is an alternating voltage of rectangular waveform (period: T1+T2). In the drive voltage Va, the reference voltage (voltage corresponding to the center of the wave) is 0 V.

As shown in FIGS. 5 to 7, in the drive voltage Va, during time T1 corresponding to the first stage, the electric potential of the upper electrode 124 is V2 (negative voltage), which is lower than the electric potential of the lower electrode 122; and during time T2 corresponding to the second stage, the electric potential of the upper electrode 124 is V1 (positive voltage), which is higher than the electric potential of the lower electrode 122.

Figure 6A:
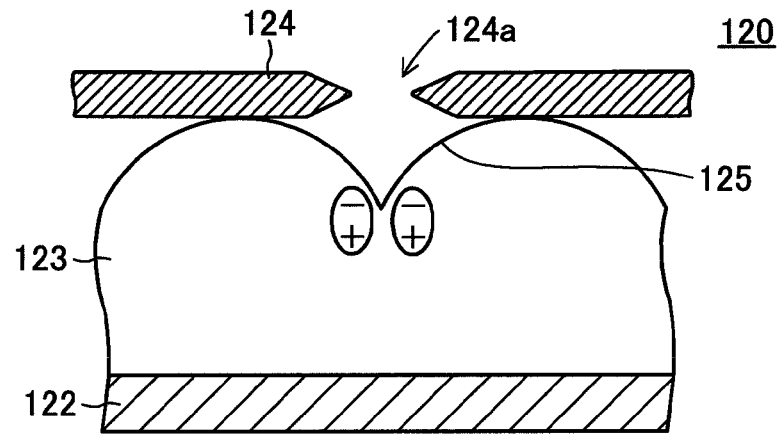
FIGS. 6A to 6C are schematic representations for explaining operation of the electron emitter of FIG. 1.

As shown in FIG. 6A, in the initial state, the emitter section 125 is polarized unidirectionally, and the negative poles of dipoles face toward the upper surface 123a of the emitter layer 123.

Firstly, in the initial state, in which the reference voltage is applied, as shown in FIG. 6A, the emitter section 125 is polarized such that the negative poles of dipoles face toward the upper surface 123a of the emitter layer 123. In this state, virtually no electrons are accumulated on the emitter section 125.

Figure 6B:
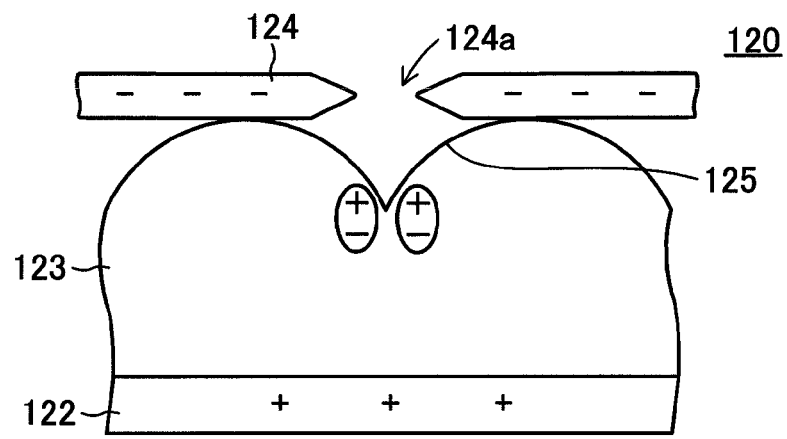
Figure 6C:
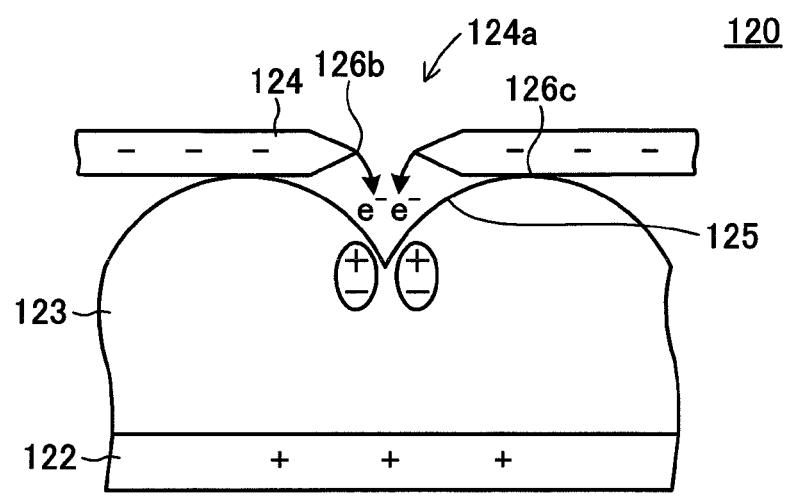

Subsequently, as shown in FIG. 6B, when the negative voltage V2 is applied, polarization is inverted. This inversion of polarization causes electric field concentration to occur at the aforementioned electric field concentration points. Through this electric field concentration, electrons are supplied from the electric field concentration points of the upper electrode 124 toward the emitter section 125, and then, as shown in FIG. 6C, electrons are accumulated on the emitter section 125. In other words, the emitter section 125 is electrically charged. This electrical charging can be continued until a predetermined saturated condition, which depends on the surface resistance of the emitter layer 123, is attained. The quantity of the charge can be controlled on the basis of control voltage application time or voltage waveform. Thus, the upper electrode 124 (in particular, the aforementioned electric field concentration points) functions as an electron supply source for the emitter section 125.

Figure 7A:
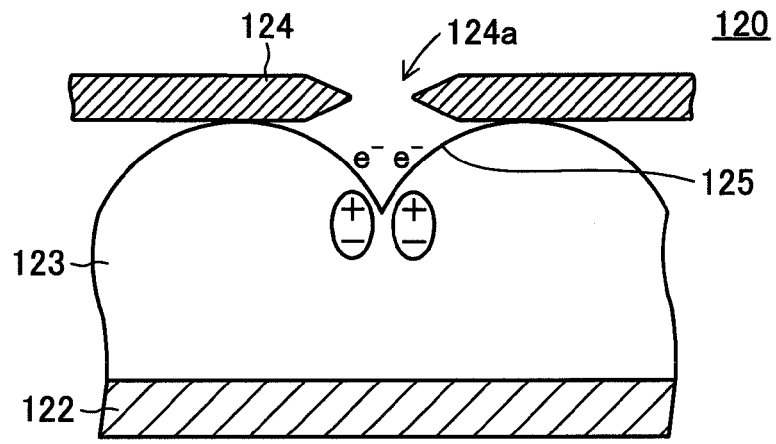
FIGS. 7A to 7C are schematic representations for explaining operation of the electron emitter of FIG. 1.
Figure 7B:
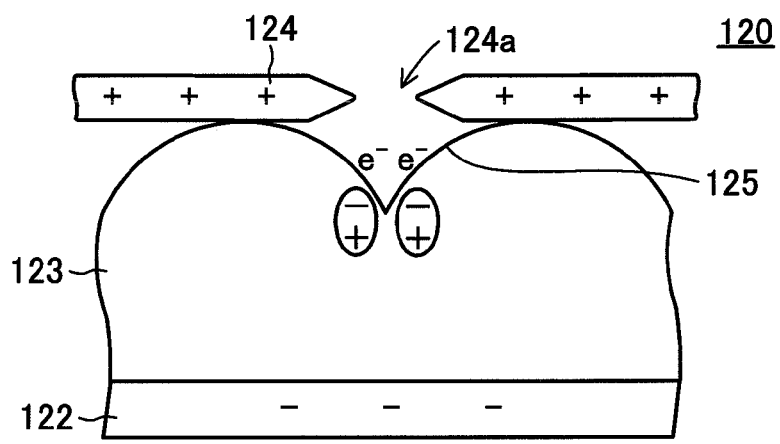
Figure 7C:
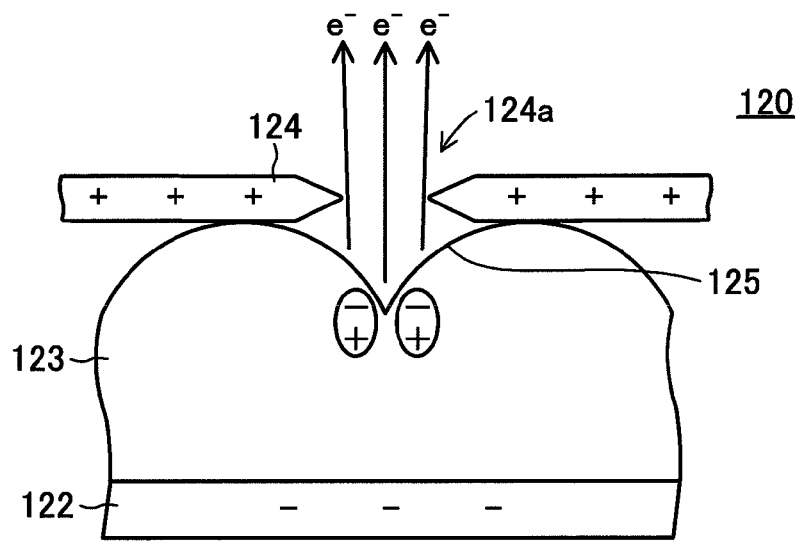

Subsequently, when the drive voltage Va is changed to the reference voltage as shown in FIG. 7A, and then the positive voltage V1 is applied as shown in FIG. 7B, polarization is re-inverted. As a result, electrostatic repulsion between the accumulated electrons and the negative poles of dipoles causes the electrons to be emitted from the emitter section 125 toward the outside of the electron emitter 120 through the opening 124a as shown in FIG. 7C.

In a manner similar to that described above, electrons are emitted from the peripheral edge portions 124b (see FIG. 1) of the upper electrode 124.

EXAMPLES

Example 1

Next will be described an electron emitter 120 of Example 1 having the aforementioned configuration with reference to the results of evaluation of the electron emitter. The electron emitter 120 of Example 1 was evaluated on the basis of change in the below-described "electron emission efficiency" (the same shall apply in Examples 2 and 3 described below).

As shown in FIG. 1, when Va represents drive voltage applied between the lower electrode 122 and the upper electrode 124; Vc represents electron accelerating voltage (collector voltage) of a bias voltage source 102 for generating an external electric field which causes electrons emitted from the electron emitter 120 to fly toward a light-emitting panel 101; $i_c$ represents current due to the electrons emitted from the electron emitter 120 (i.e., current which flows between the bias voltage source 102 and a collector electrode 101b); and P represents drive power for the electron emitter 120, electron emission efficiency η is represented by the following formula:

$$\eta = Vc \times i_c / (P + Vc \times i_c)$$

Figure 8:
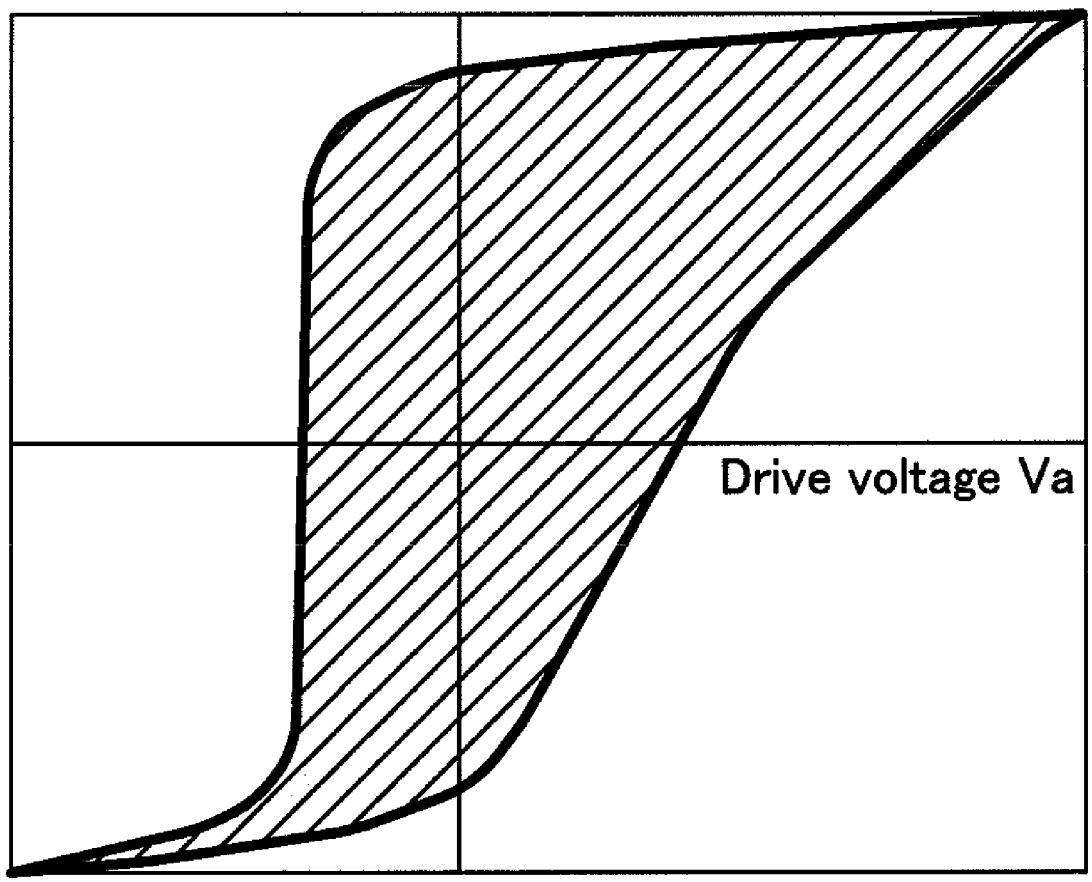
FIG. 8 shows the Q-V hysteresis of a dielectric material.

(wherein drive power P=[hysteresis loss of electron emitter: P1]+[resistance loss in drive circuit: P2]). P1 is the area enclosed by the Q-V hysteresis loop shown in FIG. 8 (i.e., the area of the shaded portion shown in FIG. 8). P2, which varies with the method for operating the electron emitter, is represented by the following inequality: 0≦P2≦(drive voltage Va×electric charge Qe)−(the area enclosed by the Q-V hysteresis loop)=(the area of a portion outside the shaded portion shown in FIG. 8). In this inequality, 0 on the left side corresponds to the case where the electron emitter 120 is operated so that the drive power satisfies the Q-V hysteresis.

In the Examples, electron emission efficiency $\eta_0$ (initial value) was obtained immediately after production of the electron emitter 120, and electron emission efficiency η was obtained after the emitter 120 was operated predetermined times. The electron emitter 120 was evaluated on the basis of the ratio r ($\eta/\eta_0$).

In Example 1, the aforementioned primary component contains, as a matrix, a lead magnesium niobate (PMN)-lead zirconate (PZ)-lead titanate (PT) ternary solid solution composition (PMN:PZ:PT=37.5:25:37.5 (by mole); the composition will be abbreviated as "37.5PMN-25PZ-37.5PT," the same shall apply hereinafter) (wherein 6 mol % of lead of the matrix is substituted by strontium, and 0.7 mol % of lead of the matrix is substituted by lanthanum), and contains cerium oxide ($CeO_2$) in an amount of 0.1 wt. % (the primary component will be abbreviated as "37.5PMN-25PZ-37.5PT/6Sr/0.7La+0.1 wt % $CeO_2$," the same shall apply hereinafter).

In Example 1, the aforementioned additional component is manganese dioxide ($MnO_2$).

In Example 1, raw materials constituting the primary component (e.g., an oxide and a carbonate salt) were mixed together by means of a ball mill or a similar apparatus, followed by calcination. An appropriate amount of the additional component was added to the thus-calcined product, and the resultant composition was subjected to molding and sintering, to thereby form the emitter layer 123 (addition after calcination).

A plurality of samples having different additional component contents were prepared. Each of the samples was employed for forming an electron emitter 120 having the configuration shown in FIG. 1. Table 1 shows the ratio r ($\eta/\eta_0$) of the electron emitter 120. Electron emission efficiency $\eta_1$ employed for calculating the ratio $r_1$ was obtained after the electron emitter 120 was operated $1.1 \times 10^8$ times. Electron emission efficiency $\eta_2$ employed for calculating the ratio $r_2$ was obtained after the electron emitter 120 was operated a predetermined times (twice or more the number of times when the electron emission efficiency $\eta_1$ for the ratio $r_1$ was calculated). In this case, $r_1$ corresponds to $\eta_1/\eta_0$, and $r_2$ corresponds to $\eta_2/\eta_0$.

TABLE 1

|  | Amount of added $MnO_2$ (wt. %) | Ratio $r_1$ = $\eta_1/\eta_0$ | Ratio $r_2$ = $\eta_2/\eta_0$ |
| --- | --- | --- | --- |
| Comparative Example | 0 | 0.06 | 0.02 |
| Sample 1 | 0.2 | 0.25 | 0.23 |
| Sample 2 | 0.6 | 0.60 | 0.52 |
| Sample 3 | 1.0 | 0.80 | 0.64 |
| Sample 4 | 1.5 | 0.80 | 0.64 |
| Sample 5 | 2.0 | 0.80 | 0.66 |

As is clear from Table 1, in the case of Comparative Example, in which no manganese dioxide ($MnO_2$) is added, electron emission efficiency $\eta_1$ obtained after $1.1 \times 10^8$ times and electron emission efficiency $\eta_2$ obtained after $4.0 \times 10^8$ times are considerably reduced as compared with the initial value $\eta_0$. In contrast, in the cases of samples 1 to 5, in which manganese dioxide ($MnO_2$) is added, reduction in electron emission efficiency $\eta_1$ obtained after $1.1 \times 10^8$ times and electron emission efficiency $\eta_2$ obtained after $4.0 \times 10^8$ times is suppressed.

In the case of Example 1, durability tends to increase (i.e., the ratios $r_1$ and $r_2$ increase) in accordance with an increase in the amount of manganese dioxide ($MnO_2$) added. Particularly when the amount of $MnO_2$ added is 0.6 wt. % or more (more preferably about 1.0 wt. %), durability is considerably improved.

When the amount of $MnO_2$ added is 1.0 wt. % or more, regardless of the number of times, improvement of durability tends to be saturated. However, initial electron emission efficiency could be lowered in accordance with an increase in the amount of $MnO_2$ added. Therefore, the amount of $MnO_2$ added is most preferably about 1.0 wt. %, from the viewpoints of electron emission efficiency and durability.

Example 2

In Example 2, the emitter layer 123 was formed from a ferroelectric material containing a primary component containing 35.5PMN-25PZ-39.5PT/6Sr/0.7La, and an additional component containing manganese dioxide ($MnO_2$). The evaluation results are described below. In Example 2, raw materials constituting the primary component (e.g., an oxide and a carbonate salt) were mixed with an appropriate amount of the additional component by means of a ball mill or a similar apparatus, and the resultant mixture was subjected to calcination, molding, and firing, to thereby form the emitter layer 123 (addition before calcination).

In Example 2, when the additional component (i.e., manganese dioxide ($MnO_2$)) was added in an amount of 0.6 wt. %, the ratio r of the resultant electron emitter was found to be 0.6. Even when the electron emitter was operated $6.5 \times 10^8$ times, the ratio r was not reduced to below 0.4.

Example 3

In Example 3, the emitter layer 123 was formed from a ferroelectric material containing a primary component containing 37.5PMN-37.5PZ-25PT/10Sr, and an additional component containing manganese dioxide ($MnO_2$). The evaluation results are described below. In Example 3, similar to the case of Example 2, the additional component was added before calcination.

In Example 3, when the additional component (i.e., manganese dioxide ($MnO_2$)) was added in an amount of 0.2 wt. %, the ratio r of the resultant electron emitter was found to be 0.7. Even when the electron emitter was operated $9.5 \times 10^8$ times, the ratio r was not reduced to below 0.4.

Example 4

In Example 4, the emitter layer 123 was formed from a ferroelectric material containing a primary component containing 37.5PMN-25PZ-37.5PT/6Sr/0.7La+0.1 wt % $CeO_2$, and an additional component containing ferric oxide ($Fe_2O_3$). The evaluation results are shown in Table 2. In Example 4, similar to the case of Example 1, the additional component was added after calcination. Electron emission efficiency $\eta_2$ employed for calculating the ratio $r_2$ was obtained after the resultant electron emitter was operated $3.0 \times 10^8$ times.

TABLE 2

|  | Amount of added $Fe_2O_3$ (wt. %) | Ratio $r_1$ = $\eta_1/\eta_0$ | Ratio $r_2$ = $\eta_2/\eta_0$ |
| --- | --- | --- | --- |
| Sample 6 | 0.2 | 0.80 | 0.70 |
| Sample 7 | 0.6 | 0.60 | 0.50 |
| Sample 8 | 1.0 | 0.68 | 0.58 |
| Sample 9 | 1.5 | 0.60 | 0.54 |

In Example 4, when the additional component (i.e., ferric oxide ($Fe_2O_3$)) is added in an amount of 0.2 wt. % (sample 6), the ratio $r_1$ and the ratio $r_2$ are 0.8 and 0.7, respectively. Meanwhile, when the additional component is added in an amount of 0.6 wt. % (sample 7), the ratio $r_1$ and the ratio $r_2$ are 0.6 and 0.5, respectively.

As described above, in the case of Example 4, even when the amount of ferric oxide ($Fe_2O_3$) added is relatively small (0.2 wt. %) (sample 6), the ratio r is not reduced to below 0.70 after $1.1 \times 10^8$ times or $3.0 \times 10^8$ times; i.e., the electron emitter exhibits very excellent durability.

As is clear from Table 2, in the case where ferric oxide ($Fe_2O_3$) is added, even when the amount of $Fe_2O_3$ varies within a range of about 2 wt. % or less, good durability is attained. Specifically, regardless of the amount of $Fe_2O_3$ added, the ratio $r_1$ after $1.1 \times 10^8$ times is not reduced to below 0.6, and the ratio $r_2$ after $3.0 \times 10^8$ times is not reduced to below 0.5.

When ferric oxide ($Fe_2O_3$) is added in any of the aforementioned amounts, a decrease from the ratio $r_1$ after $1.1 \times 10^8$ times to the ratio $r_2$ after $3.0 \times 10^8$ times is 0.1 or less; i.e., the degree of deterioration of electron emission property in accordance with an increase in the number of times is suppressed.

Thus, in the case of Example 4 (i.e., addition of ferric oxide ($Fe_2O_3$)), the electron emitter exhibits very good durability.

Summary of Examples

As described above, in the Examples, reduction in electron emission efficiency, which is due to repeated use of the electron emitter, is effectively suppressed. This suppression is considered to be attributed to the following mechanism.

As described above, alternating voltage is applied to the emitter section 125 in a reduced-pressure atmosphere. In such a reduced-pressure atmosphere, oxygen partial pressure is low, and thus metallic lead tends to precipitate through reduction of a PMN-PZ-PT ternary solid solution composition constituting the emitter section 125. However, when a high-valent transition metal is added in the form of an oxide (to form a solid solution or mixture) to the emitter section 125, the oxide serves as an oxidizing agent, and precipitation of metallic lead, which is due to reduction of the PMN-PZ-PT ternary solid solution composition, is suppressed. Therefore, deterioration of the electron accumulation ability of the emitter section 125 is suppressed.

<Modifications>

The aforementioned embodiment and Examples are merely typical embodiment and Examples of the present invention which have been considered best by the present applicant at the time when the present application has been filed. Thus, the present invention is not limited to the aforementioned embodiment and Examples. Therefore, it should be understood that various modifications of the aforementioned embodiment and Examples may be made so long as the essentials of the present invention are not changed.

(i) Application of the electron emitter of the present invention is not limited to FEDs. The configuration of the electron emitter of the present invention is not limited to that described in the aforementioned embodiment. For example, in the electron emitter 120 according to the aforementioned embodiment, the lower electrode 122 is formed on the lower surface 123c of the emitter layer 123, and the upper electrode 124 is formed on the upper surface 123a of the emitter layer 123. However, this configuration may be modified such that a first electrode and a second electrode are formed on the upper surface 123a of the emitter layer 123.

(ii) The substrate 121 may be formed of a metal in place of a glass or ceramic material. No particular limitation is imposed on the type of the ceramic material constituting the substrate 121. However, from the viewpoints of heat resistance, chemical stability, and insulating property, the substrate 121 is preferably formed of a ceramic material containing at least one species selected from the group consisting of stabilized zirconium oxide, aluminum oxide, magnesium oxide, mullite, aluminum nitride, silicon nitride, and glass. More preferably, the substrate 121 is formed of stabilized zirconium oxide, from the viewpoints of high mechanical strength and excellent toughness.

As used herein, the term "stabilized zirconium oxide" refers to zirconium oxide in which crystal phase transition is suppressed through addition of a stabilizer. The stabilized zirconium oxide encompasses partially stabilized zirconium oxide. Examples of the stabilized zirconium oxide which may be employed include zirconium oxide containing a stabilizer (e.g., calcium oxide, magnesium oxide, yttrium oxide, scandium oxide, ytterbium oxide, cerium oxide, or an oxide of a rare earth metal) in an amount of 1 to 30 mol %. From the viewpoint of considerable enhancement of mechanical strength, zirconium oxide containing yttrium oxide as a stabilizer is preferred. In this case, the yttrium oxide content is preferably 1.5 to 6 mol %, more preferably 2 to 4 mol %. Zirconium oxide containing, in addition to yttrium oxide, aluminum oxide in an amount of 0.1 to 5 mol % is preferably employed.

The stabilized zirconium oxide may have, for example, a cubic-monoclinic crystal phase, a tetragonal-monoclinic crystal phase, or a cubic-tetragonal-monoclinic crystal phase. From the viewpoints of strength, toughness, and durability, the stabilized zirconium oxide preferably has, as a primary crystal phase, a tetragonal crystal phase or a tetragonal-cubic crystal phase.

(iii) A variety of materials and methods may be employed for forming the emitter layer 123. The ferroelectric material constituting the emitter layer 123 is preferably, for example, a material having high mechanical quality factor (Qm) (i.e., a high-Qm material). For example, the ferroelectric material employed may be a lead-containing piezoelectric/electrostrictive material described in the Examples, or a lead-free piezoelectric/electrostrictive material. Specific examples of the lead-free piezoelectric/electrostrictive material include lithium niobate ($LiNbO_3$), lithium tantalate ($LiTaO_3$), a solid solution of these compounds ($LiNb_{1-x}Ta_xO_3$), a compound formed of such a solid solution in which Li is substituted by K or Na (general formula of the compound: $ABO_3$ [wherein A represents at least one species selected from among K, Na, and Li, and B represents Nb and/or Ta]), and lithium tetraborate ($Li_2B_4O_7$).

The emitter layer 123 may be formed through a generally employed dielectric film formation technique, such as screen printing, dipping, application, electrophoresis, aerosol deposition, the ion beam method, sputtering, vacuum deposition, ion plating, chemical vapor deposition (CVD), the green sheet method, the alkoxide method, and the coprecipitation method. If necessary, the emitter layer 123 may be appropriately subjected to thermal treatment.

(iv) Operational and functional elements constituting means for achieving the objects of the present invention encompass, in addition to specific structures disclosed in the aforementioned embodiment, Examples, and modifications, any structure capable of attaining the operation and function of the present invention.

What is claimed is:

1. An electron emitter comprising:

an emitter layer which comprises a primary component comprising a ferroelectric composition represented by the following formula (1):

$$Pb_xSr_pLa_q(Mg_{y/3}Nb_{2/3})_aTi_bZr_cO_3 \quad (1)$$

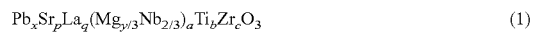

[wherein $0.85 \leq x \leq 1.03$, $0.02 \leq p \leq 0.15$, $0.001 \leq q \leq 0.15$, $0.8 \leq y \leq 1.0$, $0.1 \leq a \leq 0.55$, $0.15 \leq b \leq 0.45$, $0.1 \leq c \leq 0.6$, and a+b+c=1], and an additional component comprising a transition metal oxide of high oxidation number which can serve as an oxidizing agent by being converted into a transition metal oxide of lower oxidation number, the emitter layer being configured so that when a predetermined driving electric field is applied thereto in a reduced-pressure atmosphere, it emits electrons toward the atmosphere;

a first electrode provided on the emitter layer; and a second electrode provided on the emitter layer, the electron emitter being configured so that when the driving electric field is applied to the emitter layer through application of a predetermined drive voltage between the first electrode and the second electrode, electrons are emitted from the emitter layer toward the reduced-pressure atmosphere.

2. An electron emitter according to claim 1, wherein the transition metal is at least one of manganese, iron, chromium, cobalt, tungsten, and molybdenum.

3. An electron emitter according to claim 2, wherein the ferroelectric composition contains at least one of silicon oxide, nickel oxide, and cerium oxide.

4. An electron emitter comprising:
an emitter layer which comprises a primary component comprising a ferroelectric composition, and an additional component comprising a transition metal oxide of high oxidation number which can serve as an oxidizing agent by being converted into a transition metal oxide of lower oxidation number, the emitter layer having an emitter section provided in a reduced-pressure atmosphere;
a first electrode provided in the vicinity of the emitter section of the emitter layer; and
a second electrode provided on the emitter layer, the electron emitter being configured so that when a predetermined driving electric field is applied to the emitter section through application of a predetermined drive voltage between the first electrode and the second electrode, electrons are emitted from the emitter section toward the reduced-pressure atmosphere.

5. An electron emitter according to claim 4, wherein the ferroelectric composition contains a lead magnesium niobate-lead zirconate-lead titanate ternary solid solution composition.

6. An electron emitter according to claim 5, wherein lead contained in the ferroelectric composition is partially substituted by lanthanum and/or strontium.

7. An electron emitter according to claim 6, wherein the ferroelectric composition contains at least one of silicon oxide, nickel oxide, and cerium oxide.

8. An electron emitter according to claim 7, wherein the transition metal is at least one of manganese, iron, chromium, cobalt, tungsten, and molybdenum.

* * * * *